(12) United States Patent
Shibahara

(10) Patent No.: US 8,643,810 B2
(45) Date of Patent: Feb. 4, 2014

(54) LIQUID CRYSTAL DISPLAY DEVICE HAVING AN OUTER-SIDE OPTICAL MEMBER AND A BACKLIGHT-SIDE OPTICAL MEMBER

(75) Inventor: Seiji Shibahara, Chiba (JP)

(73) Assignee: Sony Corporation, Tokyo (JP)

( * ) Notice: Subject to any disclaimer, the term of this patent is extended or adjusted under 35 U.S.C. 154(b) by 271 days.

(21) Appl. No.: 12/875,666

(22) Filed: Sep. 3, 2010

(65) Prior Publication Data

US 2011/0085111 A1    Apr. 14, 2011

(30) Foreign Application Priority Data

Sep. 10, 2009   (JP) ................................ P2009-208798

(51) Int. Cl.
    *G02F 1/1335* (2006.01)
(52) U.S. Cl.
    USPC ............................ 349/105; 349/106; 349/112
(58) Field of Classification Search
    USPC ................... 349/56, 57, 61, 62, 68, 106, 108, 349/104–105, 112
    See application file for complete search history.

(56) References Cited

U.S. PATENT DOCUMENTS

| 2002/0126078 A1* | 9/2002 | Horibe et al. ................... 345/87 |
| 2002/0186340 A1* | 12/2002 | Kagawa et al. ............... 349/143 |
| 2004/0113125 A1* | 6/2004 | Usami et al. ............. 252/301.36 |
| 2007/0177386 A1* | 8/2007 | Masaki et al. ................ 362/296 |
| 2007/0229724 A1* | 10/2007 | Sakemoto et al. .............. 349/58 |
| 2009/0147188 A1* | 6/2009 | Yang et al. .................... 349/106 |

FOREIGN PATENT DOCUMENTS

JP       2008-170583       7/2008

* cited by examiner

*Primary Examiner* — Paul Lee
(74) *Attorney, Agent, or Firm* — Finnegan, Henderson, Farabow, Garrett & Dunner, LLP

(57) ABSTRACT

A liquid crystal display device includes: one side substrate; the other side substrate that is disposed to be opposed to the one side substrate; a liquid crystal layer that is sandwiched between the one side substrate and the other side substrate; and a light source that illuminates light on the liquid crystal layer from the outside of the other side substrate. At a specific peak wavelength, in a region shorter than a wavelength of blue light in a visible light region of the light illuminated from the light source, a transmittance from the other side substrate to the liquid crystal layer is smaller than a transmittance from the one side substrate to the liquid crystal layer.

20 Claims, 7 Drawing Sheets

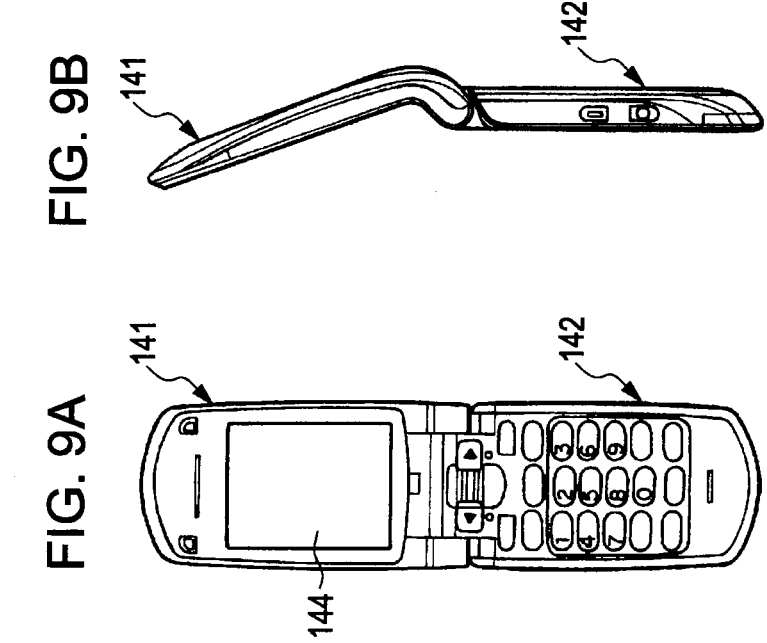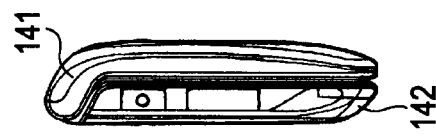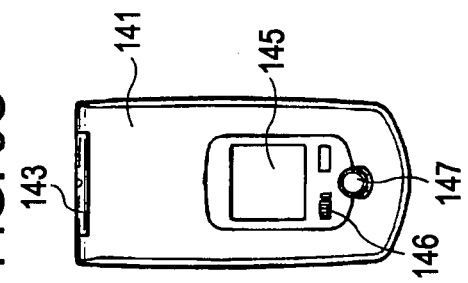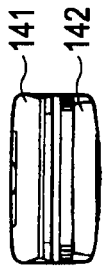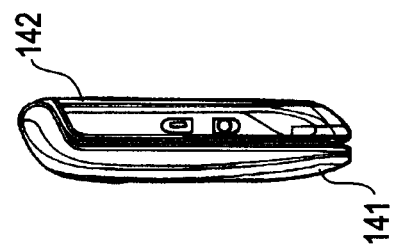

LIQUID CRYSTAL DISPLAY DEVICE HAVING AN OUTER-SIDE OPTICAL MEMBER AND A BACKLIGHT-SIDE OPTICAL MEMBER

BACKGROUND OF THE INVENTION

1. Field of the Invention

The present invention relates to a liquid crystal display device and an electronic apparatus. Specifically, the invention relates to a high-reliability and high-transmittance liquid crystal display device, which suppresses incidence of light unnecessary for a liquid crystal layer, and electronic apparatus having the same.

2. Description of the Related Art

In various display devices, liquid crystal display devices are lower-power consumption display devices which are thin in thickness and light in weight. Hence, the liquid crystal display devices are widely used in image display devices such as televisions, office automation equipment such as personal computers, and the like.

In the liquid crystal display device, a liquid crystal cell is formed by sandwiching a liquid crystal layer between two glass substrates, of which the inner side has an electrode and an alignment layer formed thereon, and sealing the liquid crystal layer with a surrounding sealant. In addition, a polarizer, a retarder, a diffuser, and a backlight are provided on the outer side of the liquid crystal cell, and thereby the display thereof is viewed from the other side. Therefore, rays, which are illuminated on the liquid crystal panel, include rays emitted from the backlight and the outside ambient light such as sunlight and interior fluorescent light.

Further, the polarizer is generally configured so that a polarizing film made of polyvinyl alcohol (PVA) is interposed between two protective films made of triacetate (TAC) (for example, refer to Japanese Unexamined Patent Application Publication No. 2008-170583). In the TAC of the protective film, an ultraviolet absorber of which the cut wavelength is 390 nm is added, thereby protecting the polarizer from the ultraviolet rays. Here, the cut wavelength means the average value between the wavelength of transmittance 72% and the wavelength of transmittance 5% on the basis of JIS B 7113 (a photographic filter). Further, similarly to the polarizer, in the retarder and the diffuser, the ultraviolet absorber of which the cut wavelength is 390 nm is added, thereby suppressing deterioration caused by ultraviolet irradiation.

SUMMARY OF THE INVENTION

In the configuration used in the related art, the polarizer, the retarder, and the diffuser each having the protective film containing the ultraviolet absorber, of which the cut wavelength is 390 nm, sufficiently absorb rays in the wavelength region of about 365 nm or less, and thus do not transmit the rays. On the other hand, in the wavelength of about 365 nm or more, these scarcely absorb light, and thus transmit the light. For this reason, protection of the polarizer, the retarder, and the diffuser is sufficient, but a problem arises in that the liquid crystal material and the like in the liquid crystal layer deteriorates.

Further, although the cut wavelength of the ultraviolet absorber is easily extended to the long wavelength side, the light necessary for the liquid crystal display device is also absorbed, and thus this causes deterioration in transmittance or color change in the liquid crystal display device.

The invention addresses the issue of providing a liquid crystal display device, which is capable of suppressing deterioration of the liquid crystal material and suppressing deterioration in transmittance, and an electronic apparatus having the same.

According to an embodiment of the invention, a liquid crystal display device includes: one side substrate; the other side substrate that is disposed to be opposed to the one side substrate; a liquid crystal layer that is sandwiched between the one side substrate and the other side substrate; and a light source that illuminates light on the liquid crystal layer from the outside of the other side substrate. At a specific peak wavelength, in a region shorter than a wavelength of blue light in a visible light region of the light illuminated from the light source, a transmittance from the other side substrate to the liquid crystal layer is smaller than a transmittance from the one side substrate to the liquid crystal layer.

In the embodiment of the invention, the external light is incident from the one side substrate to the liquid crystal layer, and the light emitted from the light source is incident from the other side substrate to the liquid crystal layer. The light emitted from the light source includes a larger amount of light with the specific peak wavelength, in a region shorter than the wavelength of blue light in the visible light region as compared with the external light. The liquid crystal display device according to the embodiment of the invention suppresses transmission of the light with specific wavelength into the liquid crystal layer by absorbing the light with specific wavelength traveling from the outside of the other side substrate toward the liquid crystal layer.

The light with specific wavelength is light having an intensity peak in the range of 404 nm to 405 nm. By preventing the light with specific wavelength from reaching the liquid crystal layer from the light source, an adverse effect on the liquid crystal layer is suppressed.

In the embodiment of the invention, it is preferable that a material, which absorbs the specific wavelength, should be added to an optical member provided between the light source and the other side substrate, or a filter, which absorbs the specific wavelength, should be provided to the optical member. Further, the light source employs a cold-cathode tube or a hot-cathode tube.

Further, according to another embodiment of the invention, an electronic apparatus includes: a casing; and a liquid crystal display device that is mounted in the casing. The liquid crystal display device includes: one side substrate; the other side substrate that is disposed to be opposed to the one side substrate; a liquid crystal layer that is sandwiched between the one side substrate and the other side substrate; and a light source that illuminates light on the liquid crystal layer from the outside of the other side substrate. At a specific peak wavelength, in a region shorter than a wavelength of blue light in a visible light region of the light illuminated from the light source, a transmittance from the other side substrate to the liquid crystal layer is smaller than a transmittance from the one side substrate to the liquid crystal layer.

In the embodiment of the invention, by absorbing the light with specific wavelength traveling from the outside of the other side substrate toward the liquid crystal layer, transmission of the light with specific wavelength into the liquid crystal layer is suppressed.

According to the embodiments of the invention, it is possible to provide a liquid crystal display device, which is capable of suppressing deterioration of the liquid crystal material while suppressing the deterioration in transmittance, and an electronic apparatus having the same.

BRIEF DESCRIPTION OF THE DRAWINGS

FIGS. 9A to 9G are diagrams illustrating a portable terminal apparatus, for example a cellular phone, to which the embodiment is applied.

DESCRIPTION OF THE PREFERRED EMBODIMENTS

Hereinafter, a mode for carrying out the invention (hereinafter referred to as an "embodiment") will be described. In addition, the description will be given in order of the following items.

Figure 1:
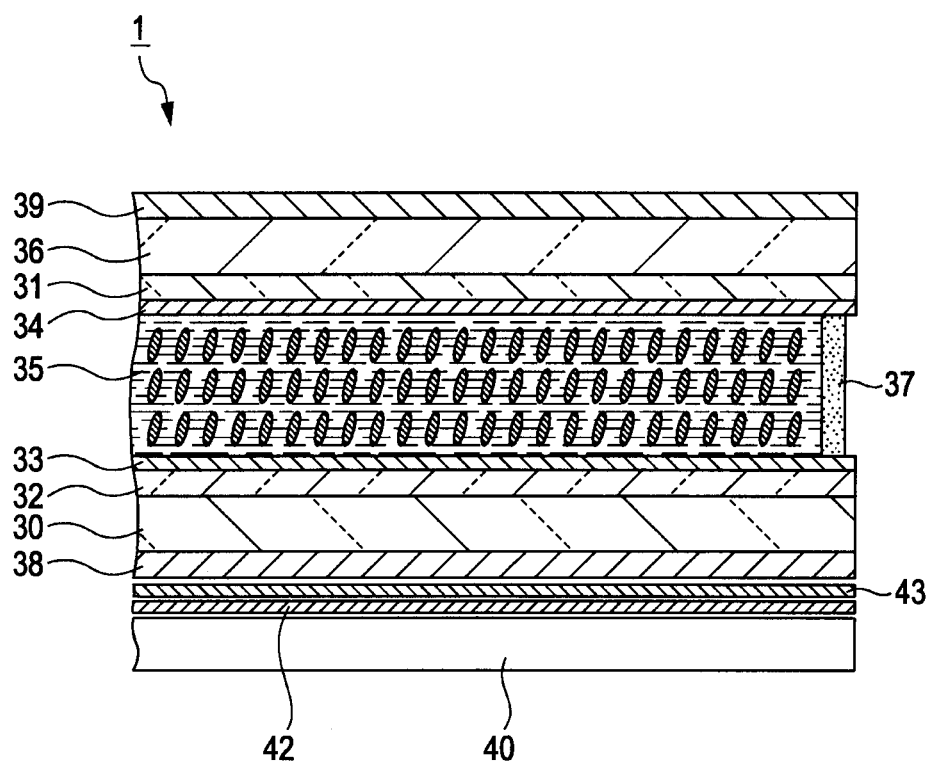
FIG. 1 is a schematic sectional view illustrating an exemplary configuration of a liquid crystal display device according to the embodiment.

1. Liquid Crystal Display Device (Exemplary Configuration of Display Section, and Exemplary Configuration of Circuit)
2. Characteristics of Liquid Crystal Display Device of Embodiment (Summary of Characteristics, and Specific Example of Optical Member)
3. Reliability Evaluation (First Evaluation, and Second Evaluation)
4. Electronic Apparatus 1. Liquid Crystal Display Device
Configuration of Display Section FIG. 1 is a schematic sectional view illustrating an exemplary configuration of a liquid crystal display device according to the embodiment. The liquid crystal display device 1 is configured as follows: a liquid crystal layer 35 is sandwiched between an upper substrate 36 of which the inner side has an electrode 31 and an alignment layer 34 formed thereon, and a lower substrate 30 of which the inner side has an electrode 32 and an alignment layer 33 formed thereon; and the periphery of the liquid crystal layer 35 is sealed by the sealant 37. Further, polarizers 38 and 39 are respectively attached to the outer sides of the upper substrate 36 and the lower substrate 30. A backlight 40 is provided on the outer side of the lower substrate 30 with a diffuser 42 interposed therebetween. With such a configuration, the display thereof is viewed from the upper substrate 36 side.

In the liquid crystal material constituting the liquid crystal layer 35, a liquid crystal with negative dielectric anisotropy is used. In addition, the liquid crystal includes a liquid crystal material having a chemical structure including an alkenyl group as a composition by 10 percent or more. In the embodiment, the liquid crystal with negative dielectric anisotropy is used, but a material with positive dielectric anisotropy may be used.

In the alignment layers 33 and 34, liquid crystal molecules contained in the liquid crystal layer 35 are aligned to achieve a predetermined orientation state. The alignment layers 33 and 34, as described above, cover the respective inner side surfaces of the upper substrate 36 and the lower substrate 30, that is, the surfaces on the sides adjacent to the liquid crystal layer 35. In the embodiment, as the alignment layers 33 and 34, a vertical alignment layer is used.

The vertical alignment layer is, for example, a vertical alignment layer that includes organic materials such as polyimide and aligns the liquid crystal molecules on the surface of the substrate in the vertical direction. In the alignment layers 33 and 34, materials, such as octadecylethoxysilane and lecithin, with homeotropic orientation can be widely used. The alignment layers 33 and 34 may be subjected to a process, such as rubbing, which controls the alignment direction.

The lower substrate 30 and the upper substrate 36 are formed as a transparent substrate such as a glass substrate. In addition, on the surface of the glass substrate, a protective film (not shown in the drawings) may be formed in order to prevent, for example, alkali ions from permeating. Further, the liquid crystal layer 35 is formed by attaching the lower substrate 30 and the upper substrate 36 with the sealant 37 so as to enclose the pixel area with spacers (not shown in the drawings), such as plastic beads and glass fiber spacers, interposed therebetween and by sealing the liquid crystal in the space between both substrates.

Further, the electrode 32 and the electrode 31, which are electric field applying sections for applying electric field to the liquid crystal layer 35, are disposed on the sides of the respective opposed surfaces of the lower substrate 30 and the upper substrate 36. The electrodes 31 and 32 are preferably made of a transparent conductor (for example, ITO (Indium Tin Oxide), IZO (Indium Zinc Oxide), ZnO (Zinc Oxide), or the like).

Furthermore, in the embodiment, the polarizer 38 provided on the lower substrate 30 and the polarizer 39 provided on the upper substrate 36 are disposed to make the absorption axes thereof orthogonal to each other. The polarizer 39 is generally configured so that a polarizing layer made of polyvinyl alcohol (PVA) is interposed between two protective layers made of triacetate (TAC).

In the TAC of the protective layer, an ultraviolet absorber of which the cut wavelength is 390 nm is added, thereby protecting the liquid crystal panel from the ultraviolet rays. Here, the cut wavelength means the average value between the wavelength of transmittance 72% and the wavelength of transmittance 5% on the basis of JIS B 7113 (a photographic filter). As the ultraviolet absorber, for example, benzophenone, benzotriazole, or the like is used.

Further, color filters and black matrices are formed on the surface of the upper substrate 36 opposed to the lower substrate 30 (not shown in the drawings). In addition, the color filters and the black matrices may be formed on the lower substrate 30.

The black matrices are preferably formed to overlap scanning signal lines, common signal lines, and data signal lines, as viewed from the direction of the normal line of the substrate surface. Further, when the color filters are formed on the lower substrate 30 side on which the TFTs (Thin Film Transistor) are formed, the ultraviolet absorber, or a visible light absorber may be added in the color filters.

The ultraviolet absorber or the visible light absorber may be added in the entire color filter layer, and may be added in the blue filter layer which transmits short-wavelength light. Further, the absorber may be added in an overcoat layer of the color filter layer.

Further, the diffuser 42 is preferably made of polystyrene, polycarbonate, cyclic polyolefin, or the like. By providing the protective layer, in which the ultraviolet absorber is added, on the surface of such a material, it is possible to protect the diffuser 42 from the ultraviolet rays.

As the ultraviolet absorber, for example, benzophenone, benzotriazole, benzotriazine, benzoate, or the like can be used.

Between the diffuser 42 and the polarizer 38, an optical sheet 43 is disposed as necessary. The optical sheet 43 is formed of, for example, a retarder or a prism sheet.

Furthermore, as the backlight 40, the cold-cathode tube, the hot-cathode tube, the LED (Light Emitting Diode), the laser light source, or the like is used.

In the above-mentioned liquid crystal display device 1, an example of a direct-view-type liquid crystal display section has been described, but a projection-type liquid crystal display section may be used. In this case, by using a light source such as an ultrahigh pressure mercury lamp instead of the backlight 40, the light emitted from the light source is separated into respective RGB colors by a dichroic mirror. Then, each light of the RGB colors is modulated and synthesized by a liquid crystal panel, and is subsequently projected onto a screen by a projection optical system.

Configuration of Circuit

Figure 2:
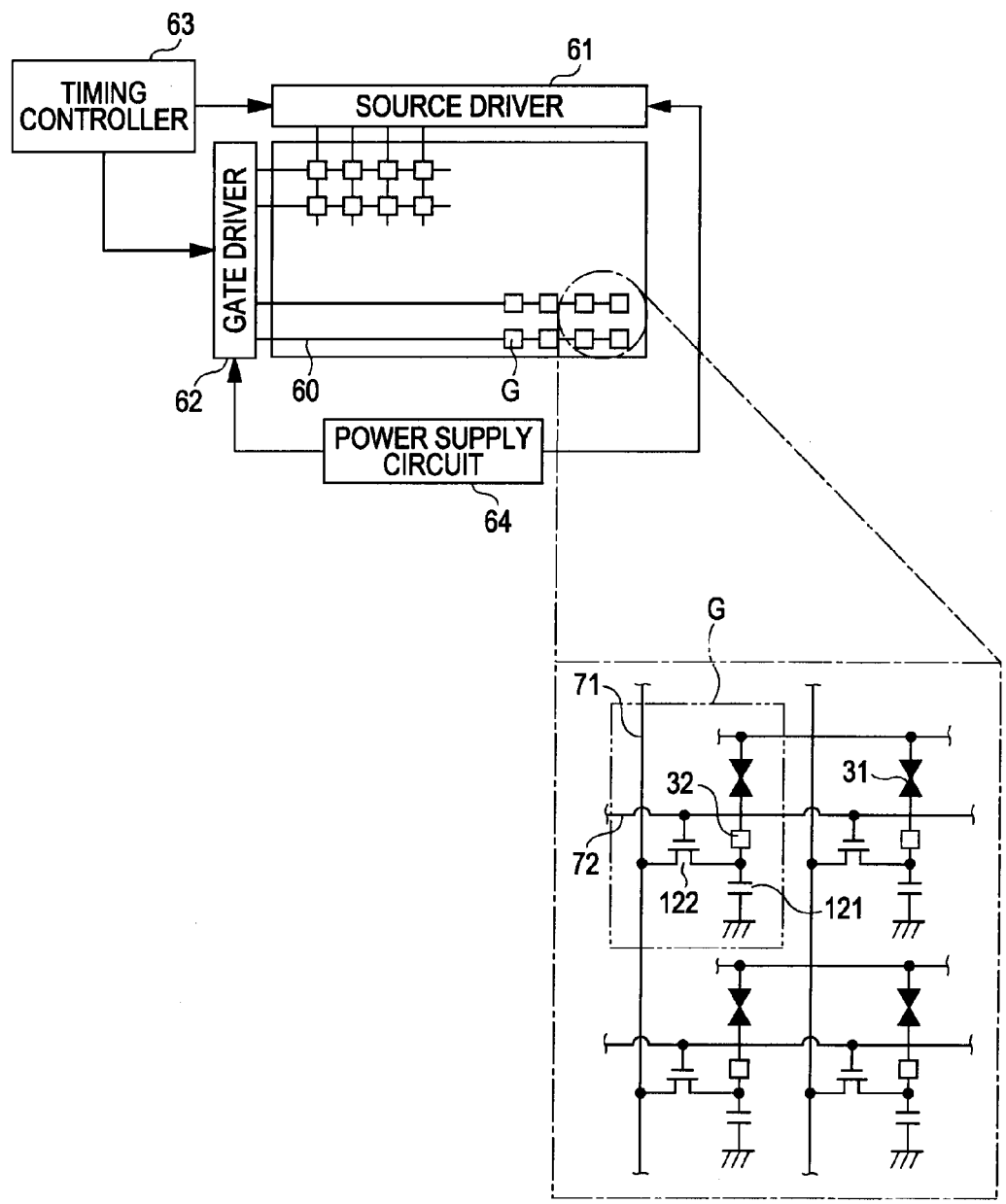
FIG. 2 is a diagram illustrating an exemplary circuit configuration of the liquid crystal display device according to the embodiment.

FIG. 2 is a diagram illustrating an exemplary circuit configuration of the liquid crystal display device according to the embodiment. The liquid crystal display device according to the embodiment includes: a display area 60; a plurality of pixels G provided in the display area 60; a source driver 61 and a gate driver 62 provided around the display area 60; a timing controller 63; and a power supply circuit 64.

The timing controller 63 controls the source driver 61 and the gate driver 62, and the power supply circuit 64 supplies electric power to the source driver 61 and the gate driver 62.

The display area 60 is an area in which video is displayed, and is an area in which the plurality of pixels G is arranged in a matrix and thereby video is displayable. In addition, FIG. 2 shows the display area 60 including the plurality of pixels G, and separately shows, in an enlarged manner, the area corresponding to four pixels G.

In the display area 60, the plurality of source lines 71 is aligned in the row direction, and simultaneously the plurality of gate lines 72 is aligned in the column direction. In addition, each pixel G is disposed at a position at which each source line 71 and each gate line 72 intersect with each other.

Each pixel G includes a transistor 121 and a capacitor 122 together with the electrode 32 and the liquid crystal layer 35. In each transistor 121, the source electrode is connected to the source line 71, the gate electrode is connected to the gate line 72, and the drain electrode is connected to the capacitor 122 and the electrode 32.

The source lines 71 are connected to the source driver 61, and are thus configured to supply image signals from the source driver 61. Further, the gate lines 72 are connected to the gate driver 62, and are thus configured to sequentially supply scanning signals from the gate driver 62.

The source driver 61 and the gate driver 62 select a specific pixel G among the plurality of pixels G.

The timing controller 63 outputs, for example, image signals (for example, RGB video signals corresponding to red, green, and blue) and a source driver control signal for controlling the source driver 61 to the source driver 61.

Further, the timing controller 63 outputs, for example, a gate driver control signal for controlling an operation of the gate driver 62 to the gate driver 62. The source driver control signal is defined to include, for example, a horizontal synchronization signal, a start pulse signal, a clock signal for the source driver, and the like. The gate driver control signal is defined to include, for example, a vertical synchronization signal, a clock signal for the gate driver, and the like.

Next, referring to FIGS. 1 and 2, the operation of the liquid crystal display device will be described. The liquid crystal display device displays video by applying a driving voltage between the electrode 32 and the electrode 31 in the following manner. Specifically, the source driver 61 supplies separate image signals to the predetermined source lines 71 on the basis of the image signals which are input from the timing controller 63 in response to the input of the source driver control signals from the same timing controller 63. Concurrently, the gate driver 62 sequentially supplies the scanning signals to the gate lines 72 at a predetermined timing in response to the input of the gate driver control signals from the timing controller 63. Thereby, the pixel G is selected which is positioned at the intersection point between the source line 71 supplied with the image signal and the gate line 72 supplied with the scanning signal, and thus the driving voltage is applied to the pixel G.

In the selected pixel G, when the driving voltage is applied, the orientation state of liquid crystal molecules, which are included in the liquid crystal layer 35, changes in response to the potential difference between the electrode 32 and the electrode 31. Specifically, the orientation states of the liquid crystal molecules respond by changing from the vertical (perpendicular) direction into the horizontal (parallel) direction with respect to the lower substrate 30 and the upper substrate 36.

In such a manner, optical characteristics of the liquid crystal layer 35 are changed, and the light incident into the liquid crystal display element is changed into modulated emission light, and grayscale is expressed on the basis of the emission light, thereby displaying video.

2. Characteristics of Liquid Crystal Display Device of Embodiment

Summary of Characteristics

The liquid crystal display device 1 according to the embodiment has a goal of suppressing deterioration of the liquid crystal material while suppressing deterioration in transmittance and change in color. In order to achieve this goal, in the embodiment, the liquid crystal display device 1 includes: the pair of transparent substrates (the upper substrate 36, and the lower substrate 30); the liquid crystal layer 35 which is sandwiched between the substrates; and the light source (the backlight 40) which illuminates light on the liquid crystal layer 35 from the outside of the lower substrate 30, and the liquid crystal display device 1 has the following characteristics.

That is, in the liquid crystal display device 1 of the embodiment, the transmittance at the specific peak wavelength, in a region shorter than the wavelength of blue light in the visible light region of the light emitted from the backlight 40, is set as follows. The transmittance from the lower substrate 30 to the liquid crystal layer 35 is smaller than the transmittance from the upper substrate 36 to the liquid crystal layer 35.

Here, in the visible light region, the short wavelength side thereof ranges from 360 nm to 400 nm, and the long wavelength side thereof ranges from 760 nm to 830 nm. Further, the specific wavelength is a wavelength having a peak in the range of 404 nm to 405 nm. In the embodiment, the wavelength having a peak at 405 nm is described as an example of the specific wavelength.

Figure 3:
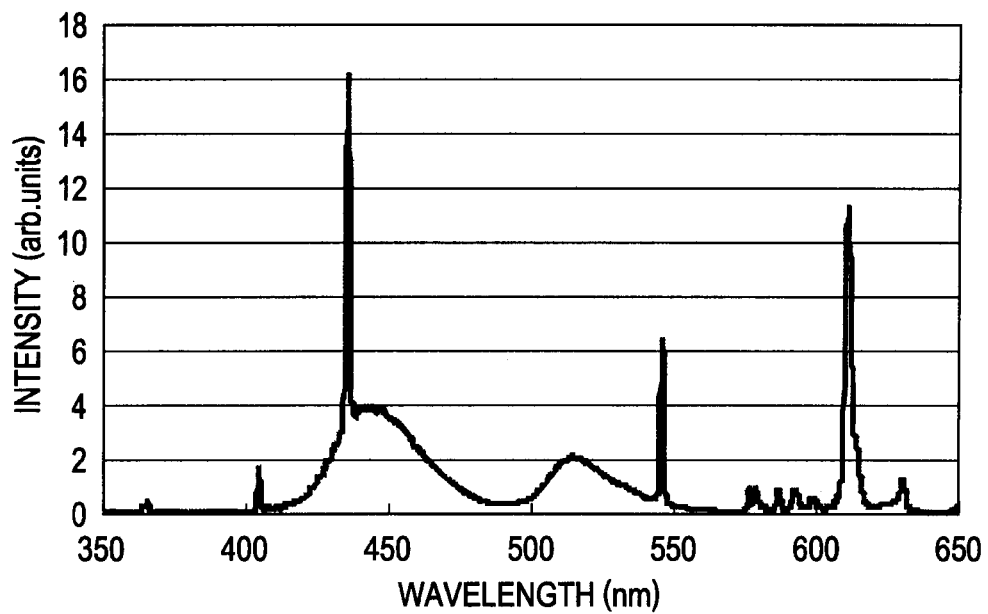
FIG. 3 is a diagram illustrating optical spectra of a backlight formed by a cold-cathode tube.

FIG. 3 is a diagram illustrating optical spectra of a backlight formed by a cold-cathode tube. Here, the light having a peak in the vicinity of the wavelength of 430 nm is blue, the light having a peak in the vicinity of the wavelength of 540 nm is green, and the light having a peak in the vicinity of the wavelength of 620 nm is red. Further, in the visible light region, there is also light (the near-ultraviolet light) with the wavelength of 405 nm having a peak in the region of the wavelength shorter than the wavelength of the blue light.

As described above, in the liquid crystal display device 1 of the embodiment, the transmittance of the light with the wavelength of 405 nm is set as follows. The transmittance from the backlight 40 to the liquid crystal layer 35 through the lower substrate 30 is smaller than the transmittance from the upper substrate 36 to the liquid crystal layer 35. With such a configuration, the transmission of the light with the wavelength of 405 nm from the backlight 40 to the liquid crystal layer 35 is suppressed, thereby preventing the liquid crystal layer 35 from deteriorating.

Usually, regarding the intensity of the light incident into the liquid crystal layer 35, light incident from the backlight 40 side is stronger than light (the external light), such as sunlight and interior fluorescent light, incident from the environment. That is, there is less concern about deterioration of the liquid crystal within the liquid crystal layer 35 due to the external light incident from the outside into the liquid crystal layer 35. Accordingly, in an optical member on the external light side of the liquid crystal layer 35, there is less concern about deterioration of the liquid crystal even when the transmittance of the light with the wavelength of 405 nm is high. In contrast, the transmittance around the wavelength of 405 nm is set to be high, thereby suppressing reduction in transmittance of the display element.

Generally, there are many cases where the ultraviolet/visible light absorbers have wide absorption spectra. Therefore, when the transmittance around the wavelength of 405 nm is reduced, this also causes reduction in transmittance at the available wavelength longer than the wavelength of 405 nm. Accordingly, in an optical member (which also includes the upper substrate 36) on the upper substrate 36 side, the transmittance around the wavelength 405 nm is set to be high, thereby improving the transmittance of light in a wide wavelength range.

On the other hand, on the light source side such as the backlight 40, an optical member (which includes the lower substrate 30), of which the transmittance around the wavelength of 405 nm is low, is provided between the liquid crystal layer 35 and the backlight 40. Normally, the transmittance of the liquid crystal cell is as low as 3 to 10%. Hence, in order to maintain a luminance sufficient for a display element, a strong light source such as the backlight 40 is necessary. Since the strong light is incident into the liquid crystal layer 35, there is a concern about deterioration of the liquid crystal layer 35 due to the visible light (the near-ultraviolet light) around the wavelength of 405 nm.

Consequently, in the liquid crystal display device 1 of the embodiment, the backlight 40 is provided to be close to the lower substrate 30 side. Thus, the transmittance of the light, which is transmitted through the liquid crystal layer 35 from the outer side of the lower substrate 30, around the wavelength of 405 nm is suppressed by the optical member (which includes the lower substrate 30).

Specific Example of Optical Member

In the following description, the optical member (which includes the lower substrate 30) provided on the lower substrate 30 side is referred to as a backlight-side optical member, and the optical member (which includes the upper substrate 36) provided on the upper substrate 36 side is referred to as an outer-side optical member.

In the liquid crystal display device of the embodiment, the backlight-side optical member is provided with a material which absorbs the visible light (the near-ultraviolet light) around the wavelength of 405 nm. For example, a material, which absorbs the visible light (the near-ultraviolet light) around the wavelength of 405 nm, may be added to the polarizer 38, the diffuser 42, or the optical sheet 43 disposed between the backlight 40 and the lower substrate 30. Alternatively, a film, which absorbs the visible light (the near-ultraviolet light) around the wavelength of 405 nm, may be attached to the polarizer 38, the diffuser 42, or the optical sheet 43.

Further, the outer-side optical member may include a material or a member containing the ultraviolet absorber. By making the optical material contain the ultraviolet absorber, it is possible to reduce the transmittance around the wavelength of 405 nm.

Furthermore, the outer-side optical member may include different ultraviolet absorbers. For example, the outer-side optical member may employ an ultraviolet absorber of which the transmittance around the wavelength of 405 nm is high but the transmittance at a wavelength less than the wavelength of 405 nm is low. In addition, the backlight-side optical member may employ an ultraviolet absorber of which the transmittance around the wavelength of 405 nm and at a wavelength less than the wavelength of 405 nm is low.

Further, the backlight-side optical member and the outer-side optical member may respectively include ultraviolet light and visible light absorbers. By making the constituent materials of the optical members include the ultraviolet light and visible light absorbers, it is possible to reduce the transmittance around the wavelength of 405 nm.

Furthermore, the concentration of the ultraviolet light and visible light absorber varies between the backlight-side optical member and the outer-side optical member. For example, in the outer-side optical member, the concentration of the ultraviolet light and visible light absorber may be set to be higher than the concentration of the ultraviolet light and visible light absorber of the backlight-side optical member.

Further, as the backlight 40, a cold-cathode tube may be used. In addition, by using the color filter and the cold-cathode tube which uses the light emission of a fluorescent substance, it is possible to embody a display device capable of color display.

Furthermore, as the backlight 40, a hot-cathode tube may be used. In addition, by using the color filter and the hot-cathode tube which uses the light emission of a fluorescent substance, it is possible to embody a display device capable of color display.

Further, as the backlight 40, three short wavelength light sources, of which the main wavelengths are different from each other mainly in the visible wavelength region of 420 nm or more, for example, LEDs may be employed.

Furthermore, the backlight-side optical member may include two or more kinds of optical components and a diffuser 42. Thus, the light transmittance of the diffuser 42 at the wavelength of 405 nm may be set to be smallest among the optical components.

By setting the light transmittance of the diffuser 42 at the wavelength of 405 nm to be smallest, it is possible to reduce the intensity of the light with the wavelength of 405 nm illuminated on not only the liquid crystal layer 35 but also the optical components (for example, the retarder, and the prism sheet) provided between the diffuser 42 and the liquid crystal layer 35. That is, it is possible to suppress deterioration caused by irradiation of light with the wavelength of 405 nm in not only the liquid crystal material but also the optical components. When two or more sheets of the diffusers 42 are used, the transmittances of the diffusers 42 at the wavelength of 405 nm may be set to be the same, and the light transmittance of a diffuser closer to the backlight 40 at the wavelength of 405 nm may be set to be smaller.

Further, at the wavelength of 405 nm, the light transmittance of the backlight-side optical member may be set to be equal to or less than a half of the light transmittance of the outer-side optical member.

Usually, regarding the intensity of the light incident into the liquid crystal layer 35, light incident from the backlight 40 side is stronger than the outside ambient light such as sunlight and interior fluorescent light. For example, in the environment of use of the image display devices such as televisions and office automation equipment such as personal computers, the intensity thereof is normally in the range of about 200 to 1000 lux. Consequently, there is less concern about deterioration of the liquid crystal within the liquid crystal layer 35 due to the light incident on the liquid crystal layer 35 from the external light side.

Meanwhile, it is necessary for the intensity of the light incident from the backlight 40 side to be stronger than that of the external light. That is, since normally the transmittance of the liquid crystal cell is as low as 3 to 10%, in order to maintain a luminance sufficient for a display element, a strong light source such as the backlight 40 is necessary. For example, the luminance of the liquid crystal display device is normally in the range of about 200 to 500 candela. That is, the luminance of the backlight 40 is in the range of about 2000 to 5000 candela.

As described above, the luminance of the back light 40 is in the range of about 2000 to 5000 candela, and such high intensity light is incident into the liquid crystal layer 35. Thus, there is a concern about deterioration of the liquid crystal layer 35 due to the visible light (the near-ultraviolet light) around the wavelength of 405 nm. Accordingly, an optical member, of which the transmittance of the light around the wavelength of 405 nm is low, is provided between the backlight 40 and the liquid crystal layer 35, thereby suppressing the deterioration of the liquid crystal layer 35.

By setting the transmittance of the light with the wavelength of 405 nm in the backlight-side optical member to be at least a half or less of the transmittance of the outer-side optical member, it is possible to suppress deterioration of the liquid crystal material included in the liquid crystal layer 35.

Further, the color filters may employ filters in which coloration layers transmitting light of red (R), green (G), and blue (B) are disposed corresponding to each pixel. In addition, another appropriate color may be used, and may be added. As another color, for example yellow or cyan may be used. The coloration layers are disposed on one of the two substrates (the upper substrate 36 and the lower substrate 30) between which the liquid crystal layer 35 is interposed, and thus use light absorption. Hence, the light transmitted through each pixel can be colored red, green, or blue, and thus the color display is achieved. By controlling the voltage of each pixel, it is possible to form an optional color at one optional point on the display pixel area (no color formation means that black is also possible).

Normally, the color filters are mostly provided on a side opposite to the backlight 40 when the liquid crystal layer 35 is the center. In this case, in the light from the backlight 40, light other than R, G, and B light transmitted through the color filters is absorbed. That is, the visible light (the near-ultraviolet light) around the wavelength of 405 nm is mostly absorbed, other than B pixels, and thus the amount of the visible light in the entire liquid crystal layer 35 is reduced to one third or less of its original value.

Hence, at the wavelength of 405 nm, the light transmittance of the backlight-side optical member is equal to or less than one third of the light transmittance of the outer-side optical member. Thereby, the deterioration of the liquid crystal material and the like due to the visible light (the near-ultraviolet light) around the wavelength of 405 nm can be suppressed through color filters on the external light side, and can be suppressed through the optical member including the ultraviolet light and visible light absorber on the backlight side.

Further, it may be possible to adopt a configuration which includes a liquid crystal material having a chemical structure including an alkenyl group as the liquid crystal material constituting the liquid crystal layer 35. Since the liquid crystal material having the chemical structure including the alkenyl group has low viscosity, the response speed of the liquid crystal is high.

Furthermore, sometimes the double bond of the alkenyl group may be cut by light in a wavelength region around the wavelength of the external light of violet color. Most of the liquid crystal materials, which have the chemical structure including the alkenyl group, are less resistant to the light in the wavelength region around the wavelength of the external light of violet color than the liquid crystal materials which do not include the alkenyl group. In the liquid crystal display device 1 of the embodiment, as compared with the liquid crystal display devices of the related art, the light in the wavelength region around the wavelength of the external light of violet color is less likely to be transmitted through the liquid crystal layer 35. Accordingly, as compared with the liquid crystal display devices of the related art, it is possible to reduce deterioration of the liquid crystal material, which has the chemical structure including the alkenyl group, due to the light in the wavelength region around the wavelength of the external light of violet color.

3. Reliability Evaluation

Figure 4:
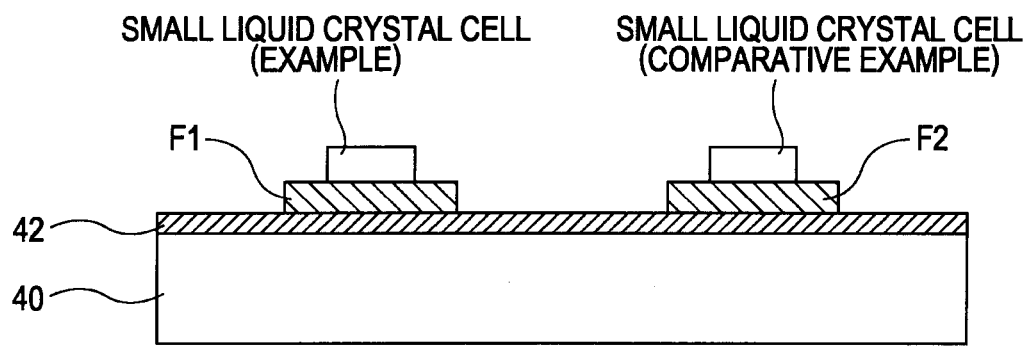
FIG. 4 is a schematic diagram illustrating a method of reliability evaluation.

Next, the reliability evaluation of the liquid crystal of the liquid crystal display device according to the embodiment will be described. FIG. 4 is a schematic diagram illustrating a method of reliability evaluation. In the reliability evaluation, two small liquid crystal cells of Example and Comparative Example are provided, and are placed on the backlight 40 and the diffuser 42 with filters F1 and F2, which have different characteristics, interposed therebetween. Then, the backlight 40 is turned on, and the characteristics of the small liquid crystal cells are evaluated.

The size of each small liquid crystal cell is vertical length of 2 cm×horizontal length of 3 cm. Each small liquid crystal cell has the same structure shown in FIG. 1, and is configured as follows: the liquid crystal layer 35 is sandwiched between the upper substrate 36 of which the inner side has the electrode 31 and the alignment layer 34 formed thereon and the lower substrate 30 of which the inner side has the electrode 32 and the alignment layer 33 formed thereon; and the periphery of the liquid crystal layer 35 is sealed by the sealant 37. Further, the liquid crystal and the alignment layer are the same as those in the embodiment.

First Reliability Evaluation

In Example, the protective layer, to which the ultraviolet absorber is added, was provided as the filter F1. Further, in Comparative Example, the protective layer is not provided on the filter F2. The protective layer according to Example employs benzotriazole as an ultraviolet absorber. Further, in Comparative Example, the ultraviolet absorber is not added, and thus the transmittance of the visible light (the near-ultraviolet light) transmitted through the small liquid crystal cell around the wavelength of 405 nm is equal to or more than three times the transmittance thereof in Example. Furthermore, other configurations are the same in Example and Comparative Example.

The voltage holding ratios of the respective small liquid crystal cells of Example and Comparative Example were examined after the elapse of 500 hours and after the elapse of 1000 hours, when the backlight 40 was turned on. When the voltage holding ratios were examined, in a state where the driving voltage was not applied at 60° C., the driving voltage equal to or more than the threshold value was applied, and the quantities of electricity charged until 167 milliseconds later were measured. In such a manner, calculation was made on the basis of the following expression: voltage holding ratio (%)=(quantity of charged electricity)/(quantity of applied electricity).

In Example, the voltage holding ratio was increased as compared with Comparative Example. Specifically, after the elapse of 500 hours, the respective ratios of Example and Comparative Example were 98.8% and 98.2%. In addition, after the elapse of 1000 hours, the respective ratios of Example and Comparative Example were 98.5% and 97.6%. That is, after the elapse of 500 hours, the difference of the voltage holding ratio between Example and Comparative Example was 0.6%. In contrast, after the elapse of 1000 hours, the difference increased to 0.9% which is 1.5 times the above. As a result, deterioration in the voltage holding ratio of Comparative Example progressed at a faster speed.

Second Reliability Evaluation

In Example, there is provided the filter F1 (to which the ultraviolet absorber is added) which does not transmit the light with the wavelength of 405 nm. In Comparative Example, there is provided the filter F2 (to which the ultraviolet absorber is not added) which transmits the light with the wavelength of 405 nm. The filters F1 and F2 are provided on the backlight 40 and the diffuser 42 (not coated with the ultraviolet absorber), and the small liquid crystal cells are mounted on the filters F1 and F2.

The voltage holding ratios of the respective small liquid crystal cells of Example and Comparative Example were examined after the elapse of 500 hours and after the elapse of 1000 hours, when the backlight 40 was turned on. When the voltage holding ratios were examined, in a state where the driving voltage was not applied at 60° C., the driving voltage equal to or more than threshold value was applied, and the quantities of electricity charged until 167 milliseconds later were measured. In such a manner, calculation was made on the basis of the following expression: voltage holding ratio (%)=(quantity of charged electricity)/(quantity of applied electricity).

In Example, the voltage holding ratio was increased as compared with Comparative Example. Specifically, after the elapse of 500 hours, the respective ratios of Example and Comparative Example are 98.8% and 98.4%. In addition, after the elapse of 1000 hours, the respective ratios of Example and Comparative Example are 98.5% and 97.9%. That is, after the elapse of 500 hours, the difference of the voltage holding ratio between Example and Comparative Example was 0.4%. In contrast, after the elapse of 1000 hours, the difference increased to 0.6% which is 1.5 times the above. As a result, deterioration in the voltage holding ratio of Comparative Example progressed at a faster speed. As described above, even in the small liquid crystal cell, it was possible to obtain the same result as the liquid crystal display element.

The voltage holding ratio is an indicator of the voltage holding of the liquid crystal display device. As impurities increase in the liquid crystal display device, the leakage current increases, and thus it becomes difficult to hold the voltage. As a result, the voltage holding ratio decreases. It can be inferred that the impurities in the liquid crystal is caused by the deterioration of the liquid crystal within the liquid crystal layer due to the light (particularly, light near the ultraviolet region) incident into the liquid crystal layer.

Further, as the voltage holding ratio decreases, the voltage being applied to the liquid crystal decreases. As the application voltage decreases, the driving voltage of the liquid crystal decreases. Therefore, the transmittance of the liquid crystal display element is reduced.

The liquid crystal display device of the embodiment (Example) has a voltage holding ratio higher than the liquid crystal display device of the related art (Comparative Example). The reason can be inferred as follows. That is, in this Example, when strong light is incident into the liquid crystal layer from the backlight, not only the incidence of the external light of violet color but also the incidence of the visible light (the near-ultraviolet light) around 405 nm into the liquid crystal layer is suppressed, and consequently deterioration of the liquid crystal due to such light is suppressed.

In contrast, in Comparative Example, the visible light (the near-ultraviolet light) around 405 nm is incident into the liquid crystal layer, and thereby disassociation deterioration of the liquid crystal promptly progresses. Thus, the voltage holding ratio is reduced, and the transmittance is also reduced.

Further, in this Example, the optical member on the external light side of the liquid crystal layer is able to suppress reduction in transmittance of the display element by setting the transmittance around the wavelength of 405 nm to be high as compared with the optical member on the backlight side of the liquid crystal layer.

In addition, the materials of the members, the size of the unit pixel, the width of the electrode, the distance between the electrodes, the thickness of the members, and the like are just examples. Accordingly, the invention is not limited to those, and may be appropriately modified.

Furthermore, the invention is not limited to the abovementioned embodiments, and may be modified into various forms within the scope of claims. The technical scope of the invention involves embodiments obtained by combination of techniques disclosed in the different preferred embodiments.

4. Electronic Apparatus

The liquid crystal display device according to the embodiment is a display device capable of reproducing high transmittance characteristics while having high reliability and excellent broad color reproducibility. The liquid crystal display device of the embodiment may be applied as a display device such as a television or a monitor, office automation equipment such as a personal computer, or an image display device (a display device) assembled in a casing of an information terminal such as a video camera, a digital camera, or a cellular phone.

Figure 5:
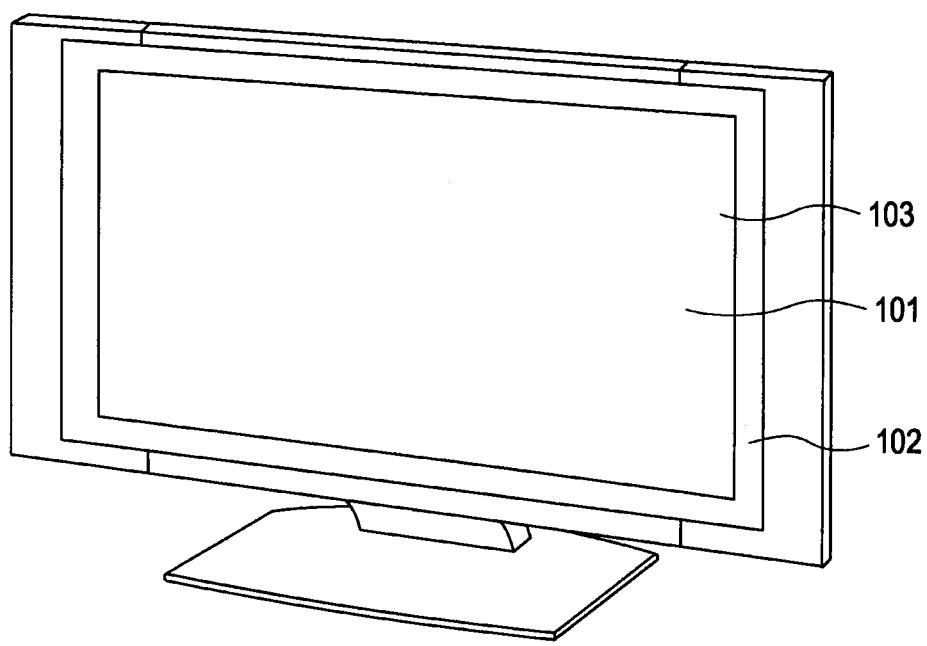
FIG. 5 is a perspective view illustrating a television to which the embodiment is applied.

FIG. 5 is a perspective view illustrating a television to which the embodiment is applied. The television according to the Application Example includes a video display screen section 101 formed of a front panel 102, a filter glass 103, and the like, and is embodied by using the liquid crystal display device according to the embodiment as the video display screen section 101.

Figure 6A:
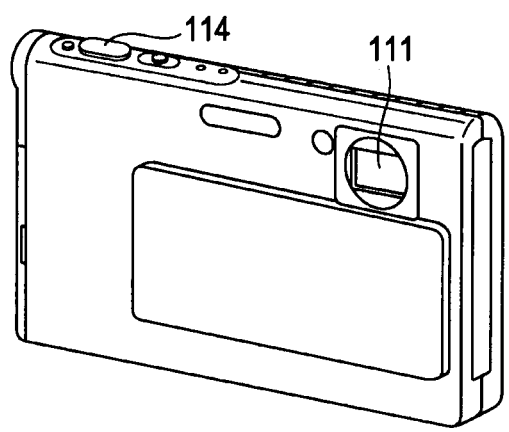
FIGS. 6A and 6B are perspective views illustrating a digital camera to which the embodiment is applied.
Figure 6B:
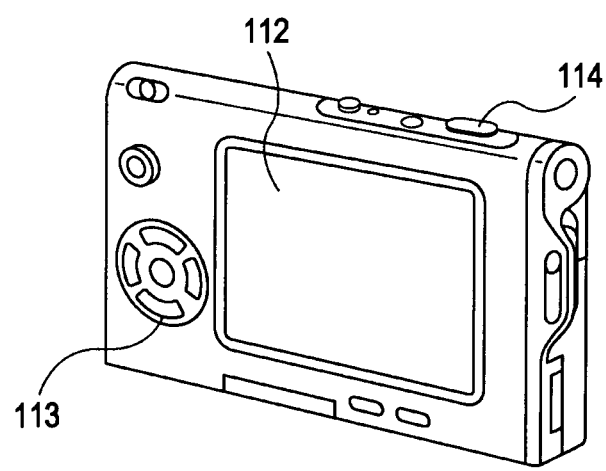

FIGS. 6A and 6B are perspective views illustrating a digital camera to which the embodiment is applied. FIG. 6A is a perspective view of the camera as viewed from the front side thereof. FIG. 6B is a perspective view of the camera as viewed from the rear side thereof. The digital camera according to the Application Example includes a photoflash light emitting section 111, a display section 112, a menu switch 113, a shutter button 114, and the like, and is embodied by using the liquid crystal display device according to the embodiment as the display section 112.

Figure 7:
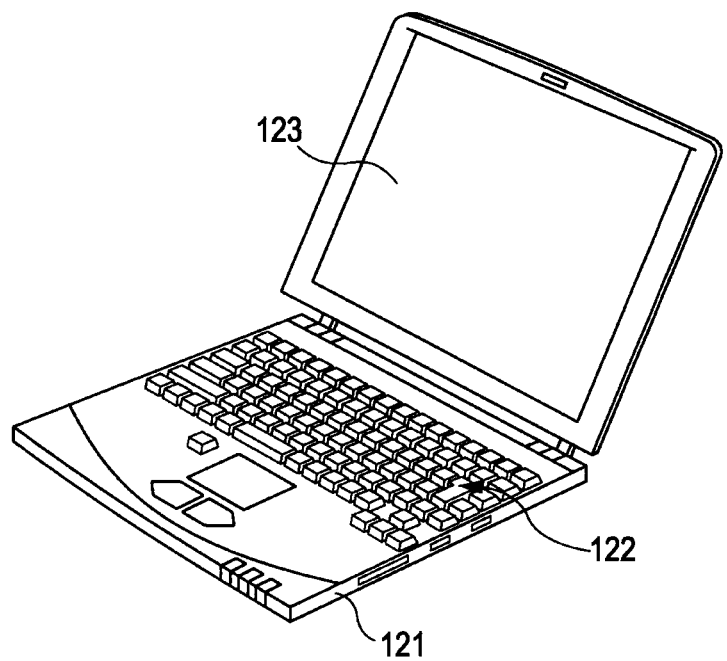
FIG. 7 is a perspective view illustrating a laptop personal computer to which the embodiment is applied.

FIG. 7 is a perspective view illustrating a laptop personal computer to which the embodiment is applied. The laptop personal computer according to the Application Example includes a main body 121, a keyboard 122 which is operated when characters and the like are input, a display section 123 which displays an image, and the like, and is embodied by using the liquid crystal display device according to the embodiment as the display section 123.

Figure 8:
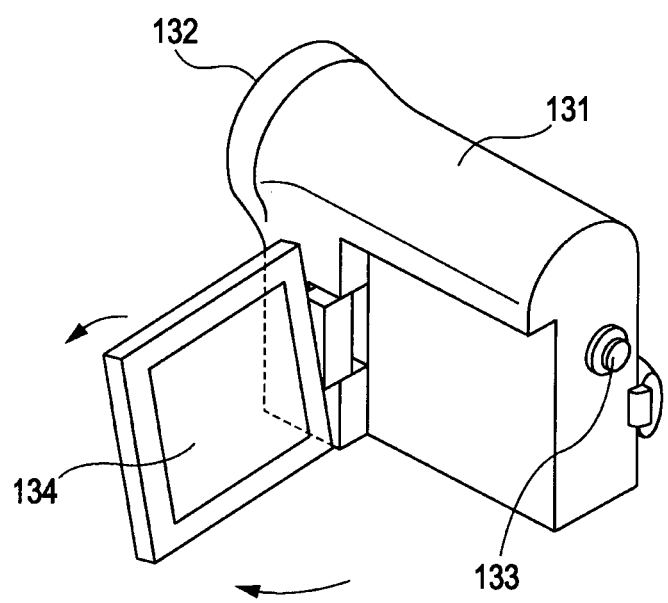
FIG. 8 is a perspective view illustrating a video camera to which the embodiment is applied.

FIG. 8 is a perspective view illustrating a video camera to which the embodiment is applied. The video camera according to the Application Example includes a main body section 131, a lens 132 which is disposed on the side facing the front and is for photographing a subject, a start/stop switch 133 at the time of photography, a display section 134, and the like, and is embodied by using the liquid crystal display device according to the embodiment as the display section 134.

FIGS. 9A to 9G are diagrams illustrating a portable terminal apparatus, for example a cellular phone, to which the embodiment is applied. FIG. 9A is a front view of the apparatus in a state where it is opened. FIG. 9B is a side view thereof. FIG. 9C is a front view of the apparatus in a state where it is folded. FIG. 9D is a left side view. FIG. 9E is a right side view. FIG. 9F is a top view. FIG. 9G is a bottom view. The cellular phone according to the Application Example includes an upper casing 141, a lower casing 142, a connection portion (here, a hinge portion) 143, a display 144, a sub-display 145, a picture light 146, a camera 147, and the like, and is embodied by using the liquid crystal display device according to the embodiment as the display 144 or the sub-display 145.

The present application contains subject matter related to that disclosed in Japanese Priority Patent Application JP 2009-208798 filed in the Japan Patent Office on Sep. 10, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device comprising:
an outer-side optical member comprising:
a first substrate; and
a first optical member including at least one first light absorber;
a backlight-side optical member comprising:
a second substrate that is disposed opposite to the first substrate; and
a second optical member including at least one second light absorber;
a liquid crystal layer that is sandwiched between the first substrate and the second substrate; and
a backlight source that illuminates light onto the liquid crystal layer from a back side of the second substrate,
wherein at a specific peak wavelength, in a region shorter than a wavelength of blue light in a visible light region of the light illuminated from the backlight source, a second transmittance associated with the backlight-side optical member comprising the second optical member including the at least one second light absorber is no more than a half of a first transmittance associated with the outer-side optical member comprising the first optical member including the at least one first light absorber.

2. The liquid crystal display device according to claim 1, wherein the specific peak wavelength is in the range of 404 nm to 405 nm.

3. The liquid crystal display device according to claim 1, wherein the second optical member is provided between the backlight source and the second substrate, and the at least one second light absorber includes a material that absorbs the specific peak wavelength.

4. The liquid crystal display device according to claim 1, wherein the second optical member is provided between the backlight source and the second substrate, and the at least one second light absorber includes a filter that absorbs the specific peak wavelength.

5. The liquid crystal display device according to claim 3, wherein the second optical member includes a diffuser.

6. The liquid crystal display device according to claim 1, wherein the light source is a cold-cathode tube.

7. The liquid crystal display device according to claim 1, wherein the light source is a hot-cathode tube.

8. A liquid crystal display device, comprising:
an outer-side optical member comprising:
a first substrate; and
a first optical member including at least one first light absorber;
a backlight-side optical member comprising:
a second substrate that is disposed opposite to the first substrate; and
a second optical member including at least one second light absorber;
a liquid crystal layer that is sandwiched between the first substrate and the second substrate; and
a backlight source that illuminates light onto the liquid crystal layer from a back side of the second substrate,
wherein color filters corresponding to R (red), G (green), and B (blue) are provided on a surface of the second substrate, and wherein at a specific peak wavelength, in a region shorter than a wavelength of blue light in a visible light region of the light illuminated from the backlight source, a second transmittance associated with the backlight-side optical member comprising the second optical member including the at least one second light absorber is no more than one third of a first transmittance associated with the outer-side optical member comprising the first optical member including the at least one first light absorber.

9. The liquid crystal display device according to claim 1, wherein a liquid crystal material constituting the liquid crystal layer includes a material having a chemical structure containing an alkenyl group.

10. An electronic apparatus comprising:
a casing; and
a liquid crystal display device that is mounted in the casing, wherein the liquid crystal display device includes
an outer-side optical member comprising:
a first substrate; and
a first optical member including at least one first light absorber;
a backlight-side optical member comprising:
a second substrate that is disposed opposite to the first substrate; and
a second optical member including at least one second light absorber;
a liquid crystal layer that is sandwiched between the first substrate and the second substrate; and
a backlight source that illuminates light onto the liquid crystal layer from a back side of the second substrate,
wherein at a specific peak wavelength, in a region shorter than a wavelength of blue light in a visible light region of the light illuminated from the backlight source, a second transmittance associated with the backlight-side optical member comprising the second optical member including the at least one second light absorber is no more than a half of a first transmittance associated with the outerside optical member comprising the first optical member including the at least one first light absorber.

11. The electronic apparatus according to claim 10, wherein the specific peak wavelength is in the range of 404 nm to 405 nm.

12. The electronic apparatus according to claim 10, wherein the second optical member is provided between the backlight source and the second substrate, and the at least one second light absorber includes a material that absorbs the specific peak wavelength.

13. The electronic apparatus according to claim 10, wherein the second optical member is provided between the backlight source and the second substrate, and the at least one second light absorber includes a filter that absorbs the specific peak wavelength.

14. The electronic apparatus according to claim 12, wherein the second optical member includes a diffuser.

15. The electronic apparatus according to claim 13, wherein the second optical member includes a diffuser.

16. The liquid crystal display device according to claim 4, wherein the second optical member includes a diffuser.

17. The liquid crystal display device according to claim 8, wherein the specific peak wavelength is in a range of 404 nm to 405 nm.

18. The liquid crystal display device according to claim 8, wherein the second optical member is provided between the backlight source and the second substrate, and the at least one second light absorber includes a filter that absorbs the specific peak wavelength.

19. The liquid crystal display device according to claim 2, wherein the second optical member is provided between the backlight source and the second substrate, and the at least one second light absorber includes a material that absorbs the specific peak wavelength.

20. The liquid crystal display device according to claim 2, wherein the second optical member is provided between the backlight source and the second substrate, and the at least one second light absorber includes a filter that absorbs the specific peak wavelength.

* * * * *